United States Patent
Roosli et al.

(10) Patent No.: US 9,615,429 B2
(45) Date of Patent: Apr. 4, 2017

(54) ILLUMINATING DEVICES AND SYSTEMS

(71) Applicant: Honeywell International Inc., Morristown, NJ (US)

(72) Inventors: Philipp Anton Roosli, Niantic, CT (US); Michael D. Sobanko, Oakdale, CT (US); Brendan H. Donecker, East Haddam, CT (US)

(73) Assignee: Honeywell International Inc., Morris Plains, NJ (US)

( * ) Notice: Subject to any disclaimer, the term of this patent is extended or adjusted under 35 U.S.C. 154(b) by 106 days.

(21) Appl. No.: 14/323,724

(22) Filed: Jul. 3, 2014

(65) Prior Publication Data

US 2016/0007425 A1    Jan. 7, 2016

(51) Int. Cl.
  *H05B 37/02* (2006.01)
  *G05B 15/02* (2006.01)
  *G08B 13/08* (2006.01)

(52) U.S. Cl.
  CPC ......... *H05B 37/0227* (2013.01); *G05B 15/02* (2013.01); *G08B 13/08* (2013.01); *Y02B 20/44* (2013.01)

(58) Field of Classification Search
  CPC ................................ Y02B 20/44; G08B 13/08
  See application file for complete search history.

(56) References Cited

U.S. PATENT DOCUMENTS

| | | | | |
|---|---|---|---|---|
| 5,374,854 A | * | 12/1994 | Chen | H05B 37/0227 307/116 |
| 7,155,317 B1 | * | 12/2006 | Tran | H05B 37/0227 307/117 |
| 7,821,160 B1 | | 10/2010 | Roosli et al. | |
| 8,035,320 B2 | * | 10/2011 | Sibert | H05B 37/0245 315/149 |
| 8,368,310 B1 | * | 2/2013 | Roosli | H05B 37/0245 315/152 |
| 8,536,792 B1 | | 9/2013 | Roosli | |
| 8,560,128 B2 | | 10/2013 | Ruff et al. | |
| 2005/0276051 A1 | | 12/2005 | Caudle et al. | |
| 2008/0122635 A1 | * | 5/2008 | Fujikawa | H05B 37/02 340/573.1 |

(Continued)

OTHER PUBLICATIONS

"Hubbell Bryant RMS101ILW Occupancy Sensor Switch with Night Light, White", Hubbell, http://www.smarthome.com/36881WH/Hubbell-Bryant-RMS101ILW-Occupancy-Sensor-Switch-with-Night-Light-White/p.aspx, 3 pgs., Date Accessed: Nov. 25, 2013.

(Continued)

*Primary Examiner* — Douglas W Owens
*Assistant Examiner* — Pedro C Fernandez
(74) *Attorney, Agent, or Firm* — Brooks, Cameron & Huebsch, PLLC

(57) ABSTRACT

Illuminating devices and systems are described herein. One illuminating device embodiment includes a computing component configured to determine a change in a state associated with a room in which the illuminating device is located based on a signal from a sensor, and an illuminating component configured to illuminate the illuminating device at a predefined setting associated with the determined state change and discontinue illuminating the illuminating device a predefined amount of time after the change in the state.

15 Claims, 3 Drawing Sheets

(56) References Cited

U.S. PATENT DOCUMENTS

| | | | |
|---|---|---|---|
| 2010/0188218 A1* | 7/2010 | Roosli | G08B 21/22 340/545.1 |
| 2012/0286940 A1 | 11/2012 | Carmen, Jr. et al. | |
| 2012/0299485 A1* | 11/2012 | Mohan | H05B 37/0218 315/153 |
| 2013/0221859 A1 | 8/2013 | Pavelchak | |
| 2014/0068486 A1* | 3/2014 | Sellers | G06F 3/04847 715/771 |
| 2015/0323915 A1* | 11/2015 | Warren | H04L 12/2803 700/275 |

OTHER PUBLICATIONS

"Leviton OSSNL-IDG Decora Passive Infrared Wall Switch Occupancy Sensor", Leviton, http://www.amazon.com/Leviton-OSSNL-IDG-Infrared-Occupancy-Adjustable/dp/B002NU6ME8, 8 pgs., Date Accessed: Nov. 25, 2013.
"Nest Pathlight", Nest Labs, http://support.nest.com/article/What-is-Pathlight, 5 pgs., Date Accessed: Nov. 26, 2013.

* cited by examiner

ILLUMINATING DEVICES AND SYSTEMS

TECHNICAL FIELD

The present disclosure relates to illuminating devices and systems.

BACKGROUND

When a person opens a door and enters a dark hallway or room, it can be difficult to find a light source to turn on. This can be particularly difficult when the person is not familiar with the space. For example, a hotel customer can have a difficult time locating a light source when they first enter a hotel guest room. Further, the hotel customer may have a difficult time locating items in the room, and may have to enlist the assistance of hotel staff. This can increase resources of the hotel in addressing customer issues and/or decrease customer satisfaction.

A system, such as a room automation system, can be used to detect occupancy in a space using sensors and to perform one or more functions based on the detected occupancy, such as turning on lights in the space. However, in some instances, if a first person is occupying the space, such as a sleeping person, when a second person enters the space, one or more of the functions may disrupt the first person. For instance, turning all lights on when the first person is sleeping may wake up the first person.

DETAILED DESCRIPTION

Figure 1:
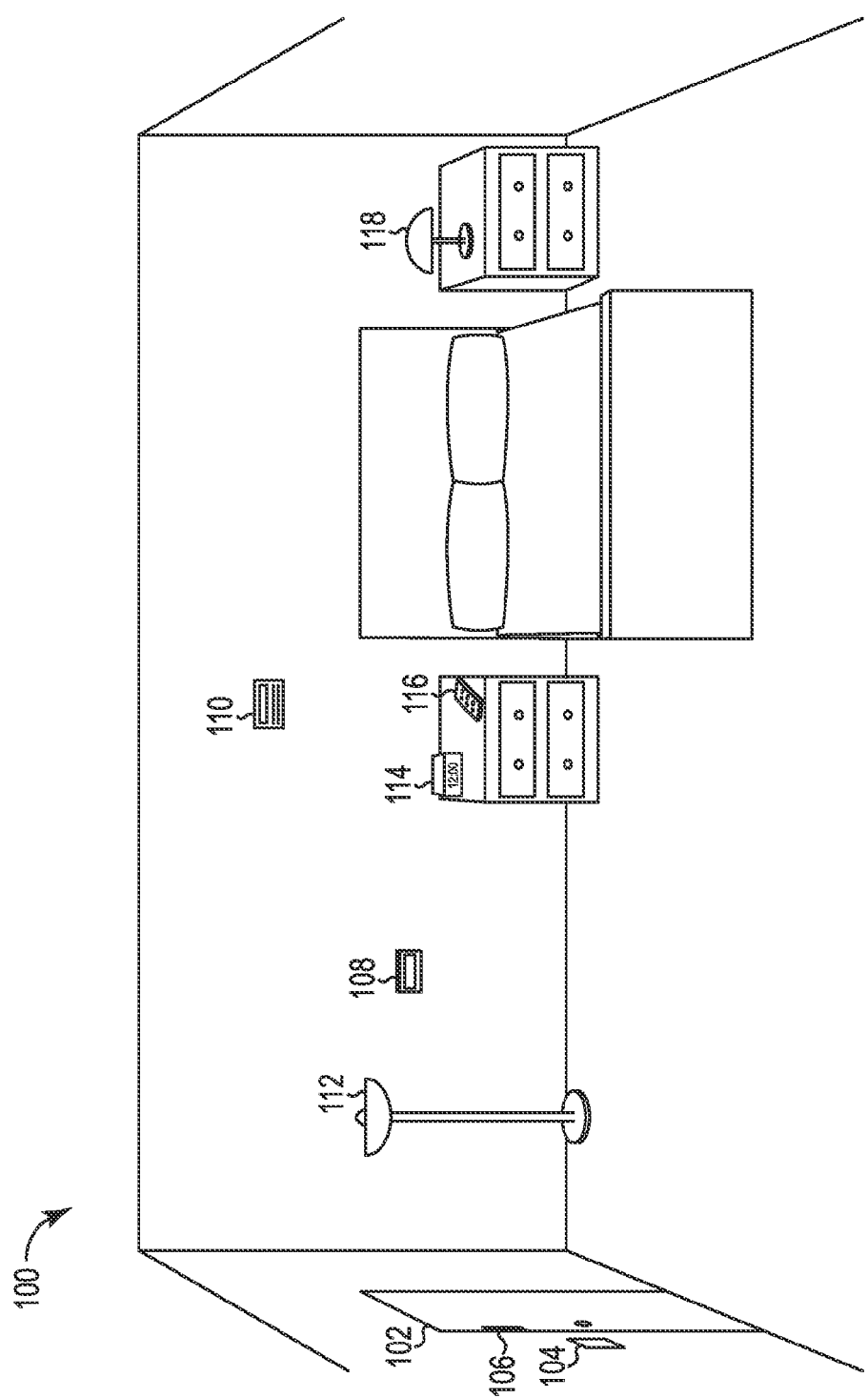
FIG. 1 illustrates an example of a system in accordance with one or more embodiments of the present disclosure.

Illuminating devices and systems are described herein. For example, one or more illuminating device embodiments can include a computing component configured to determine a change in a state associated with a room in which the illuminating device is located based on a signal from a sensor, and an illuminating component configured to illuminate the illuminating device at a predefined setting associated with the determined state change and discontinue illuminating the illuminating device a predefined amount of time after the change in the state.

A room automation system can be used to automate one or more functions in a room (e.g., without an active input from a person). For example, a room automation system can include a plurality of sensors used to detect occupancy in a room. The sensors can include motion sensors, door sensors, and/or heat sensors, as further discussed herein.

As an example, the system can sense entry into a room. A sensor on a door can, for instance, send a state change to the system and a number of functions (e.g., algorithms) can be launched. The state change can include, for example, a signal (from the sensor) to an illuminating device indicating a door has opened. The illuminating device can receive the signal and can determine a state change of the room.

However, in some instances, one or more of the automated functions can be inconvenient and/or unwanted to a person. For example, if a first person is located in the room when a second person enters the room, it may be disruptive to the first person to have a number of lights automatically turn on. The first person may, for example, be sleeping and the automated functions may wake up the first person.

Further, in some instances, additional automated functions not provided by the room automation system may be convenient to a person. For example, if the person is first entering the room, the person may be unaware of the location of many items in the room. For instance, a person first entering a hotel guest room may not know where the television remote, the alarm clock, the light switches, the thermostat, the safe, the mini-bar, etc., are located. The person may search for the various items, leading to customer frustration. The person may call the front desk and/or other hotel service for assistance, resulting in additional hotel resources to familiarize the person with the room.

Embodiments in accordance with the present disclosure can include illuminating devices and systems that can determine a change in a state of the room and illuminate one or more illuminating devices at a predefined setting associated with the determined state change. For example, illuminating devices and systems in accordance with the present disclosure can determine the first time a person has entered the room (e.g., while the room is unoccupied), a subsequent entry to the room by the person after the first time, and/or when a first person is occupying the room as a second person enters the room.

Each state change can have a predefined setting for one or more illuminating devices in the room. The predefined setting can include a predefined brightness and/or a predefined amount of time for illumination. For example, the predefined brightness and/or predefined amount of time for illumination for the first time the person enters the room can be greater than the predefined brightness and/or predefined amount of time for illumination for when a first person is occupying the room as a second person enters the room. Further, the amount of devices that illuminate can be different for each state change. For instance, each of the illuminating devices in the room can illuminate the first time the person enters the room. By contrast, a subset (e.g., not all) of the illuminating devices can illuminate during subsequent entries by the person and/or when a first person is occupying the room as a second person occupies the room.

Determining a change in the state of the room, and illuminating the illuminating devices in the room accordingly, in accordance with the present disclosure, can decrease frustration of customers and/or increase productivity of an entity associated with the room. For instance, a person that first enters a room can more easily familiarize themselves with the locations of items in the room. Further, if the room is later preoccupied by a different person, one or more of the illuminating devices can illuminate at a preoccupied state to minimize disturbance of the different person while assisting the person in entering the room. The varying predefined settings for the states of the room can increase customer satisfaction and decrease use of resources of the entity in resolving customer issues (e.g., such as calling the front desk to inquire about the location of the safe).

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the some embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be reference by 208 in FIG. 2.

As used herein, "a" refers to one or more. For example, "a sensor" can refer to one or more sensors.

FIG. 1 illustrates an example of a system 100 in accordance with one or more embodiments of the present disclosure. The system 100 can include a system of illuminating devices 104, 108, 112, 114, 116, 118.

The system 100 can be located within a room. A room, as used herein, can include an enclosed and/or partially enclosed area. Example rooms can include a hotel guest room, a party room, a conference room, and/or an office room, among other rooms.

As shown in FIG. 1, the system 100 can include a plurality of illuminating devices 104, 108, 112, 114, 116, 118. An illuminating device can include a device that can illuminate. Example illuminating devices can include a light source, a light switch, an alarm clock, a thermostat, a television remote, a safe, a refrigerator, and/or an electric source (e.g., an electrical outlet), among other devices.

For instance, the plurality of illuminating devices 104, 108, 112, 114, 116, 118 can include a portion of a room automation system. That is, some devices in the room automation system, in some embodiments, may not illuminate.

An illuminating device, as used herein, can include a computing component and an illuminating component. The computing component, as discussed further herein in connection with FIG. 2, can determine a change in a state associated with the room in which the device is located based on a signal. The signal, in some embodiments, can be from another device, another illuminating device (such as a control device), and/or from one or more sensors 106, 110.

As illustrated by FIG. 1, the system 100 can include one or more sensors 106, 110. A sensor 106, 110, as used herein, can include a device that measures and/or takes a physical quantity and converts it into a signal (e.g., a computer-readable signal). Example sensors can include a door sensor 106 and an occupancy sensor 110.

A door sensor 106 can include a sensor to detect a sequence of a door 102 of the room opening and closing. The door sensor 106 can, for instance, detect the sequence using electrical and/or mechanical sensing.

An occupancy sensor 110 can include a sensor to detect a person is located in the room associated with the system 100. Example occupancy sensors can include, for instance, motion sensors and heat sensors, as discussed further herein.

The one or more sensors 106, 110 can be used to detect occupancy in the room. For instance, a signal from the one or more sensors 106, 110 can include an identification of a sequence of a door 102 opening and closing, identification of motion in the room, and/or identification of heat (e.g., body heat) in the room, among other signals. The signals can be used to detect a person is occupying the room, as further discussed herein.

In some embodiments, each of the illuminating devices can determine a change in the state of the room based on signals from the one or more sensors 106, 110. In such embodiments, each illuminating device can use one or more functions (e.g., algorithms) to identify the state change.

Alternatively, the system 100 can include a control device. The control device can include an illuminating device 108 and/or other device (e.g., such as a remotely located device) that can determine a change in the state of the room based on signals from the one or more sensors 106, 110 using one or more functions.

The control device can send a signal to the plurality of illuminating devices 104, 108, 112, 114, 116, 118 in the room. The signal can include an indication of the state change. For instance, the signal can instruct at least a portion of the plurality of illuminating devices to illuminate at a predefined setting associated with the state of the room.

The system 100 can include multiple states between which the room can change. For example, the system 100 can include three or more states. The illuminating devices can illuminate at a predefined setting associated with a determined state change of the room. Predefined settings can include a predefined brightness and/or a predefined amount of time for illumination.

A first state of the room can include a first entered state. A first entered state can include a state entered when a person has first entered the room. A room can be in a first entered state, for instance, in response to a sequence of a door 102 opening and closing, as well as, an indication in the system 100 that the next door sequence is a first time entry (as discussed herein with regards to FIG. 3). For example, each illuminating device 104, 108, 112, 114, 116, 118 and/or the control device (e.g., device 108) can determine the person located in the room has first entered the room based on a detection by the door sensor 106 and/or the occupancy sensor 110.

In some embodiments, the control device can send a signal to the plurality of illuminating devices 104, 108, 112, 114, 116, 118 in the system 100 to enter the first state. Each of the plurality of illuminating devices can illuminate at a predefined brightness and/or for a predefined amount of time associated with the first state.

A second state of the room can include a preoccupied state. A preoccupied state can include a state entered when an additional (e.g., a different) person is located in the room when the person enters the room. A room can be determined to be in a preoccupied state, for instance, in response to identification of a first sequence of a door 102 opening and closing with subsequent motion in the room and a second sequence of a door 102 opening and closing with subsequent motion in the room.

For instance, each illuminating device 104, 108, 112, 114, 116, 118 and/or the control device can determine the additional person (e.g., a different person and/or a second person) is located in the room when a person (e.g., a first person) has entered the room based on a detection by the door sensor 106 and/or occupancy sensor 110.

In some embodiments, a control device can send a signal to the plurality of illuminating devices 104, 108, 112, 114, 116, 118 to enter a second state and/or can send a signal to a subset of the illuminating devices 104, 108, 112, 114, 116, 118 to enter the second state. Each of the plurality of illuminating devices 104, 108, 112, 114, 116, 118 and/or a subset of the plurality of illuminating devices 104, 108, 112, 114, 116, 118 can illuminate at a predefined brightness and/or for a predefined amount of time associated with the second state.

The predefined brightness and/or the predefined amount of time associated with the second state can be lower than the predefined brightness and/or the predefined amount of time associated with the first state. For instance, the person preoccupying the room may be asleep. The person that then enters the room may want to avoid disturbing the person preoccupying the room, but may have a difficult time remembering where a light source and/or other illuminating device (e.g., an alarm clock or an electrical outlet) is located.

In some embodiments, the second state can include an acoustic sound to guide the first person towards the light source and/or other illuminating device. That is, at least one of the plurality of illuminating devices can output an acoustic signal when the second state is entered.

In accordance with some embodiments, a subset of the plurality of illuminating devices 104, 108, 112, 114, 116, 118 can illuminate at the predefined setting associated with the second state. The subset can include, for example, particular illuminating devices that are in the vicinity of the door 102 and/or particular illuminating devices that may be useful to the first person to enter the room and/or settling in (e.g., prepare for bed) without disturbing the second person (such as, an alarm clock or an electrical outlet). Illuminating all illuminating devices 104, 108, 112, 114, 116, 118 can, for example, disturb the second person that may be sleeping.

By contrast, the first time the first person enters the room, the first person may be less concerned about disturbing the room and/or about light source in the room. Illuminating each of the plurality of illuminating devices 104, 108, 112, 114, 116, 118 at a higher brightness and for a longer amount of time than the second state can allow the first person to familiarize with the room and/or an item (e.g., an illuminating device) in the room.

A third state of the room can include a prior entered state. A prior entered state can include a state entered when the person has previously entered the room. A room can be in the third state, for example, in response to a sequence of a door 102 opening and closing, after a room has entered a first state (e.g., a first entered state).

For example, each illuminating device 104, 108, 112, 114, 116, 118 and/or the control device can determine the person located in the room has previously entered the room based on the detection by the door sensor 106 and a previous determination that the person first entered the room. The control device can send a signal to the plurality of illuminating devices in the system 100 to enter the third state. Each of the plurality of illuminating devices 104, 108, 112, 114, 116, 118 and/or a subset of the plurality of illuminating devices can illuminate at a predefined brightness and for a predefined amount of time associated with the third state.

The third state can be an intermediate state between the first state and the second state. For instance, the predefined brightness and/or the predefined amount of time associated with the third state can be higher than the predefined brightness and/or the predefined amount of time associated with the first state, but lower than the predefined brightness and/or predefined amount of time associated with the second state. Alternatively, the third state can include no illumination, in some embodiments.

Further, a subset of the plurality of illuminating devices 104, 108, 112, 114, 116, 118 can illuminate at the predefined setting associated with the third state. For example, when a person enters a room the second time, they may be more familiar with the room as compared to the first time. Thereby, not all of the illuminating devices 104, 108, 112, 114, 116, 118 may illuminate. The illuminating devices 104, 108, 112, 114, 116, 118 that are included in the subset can include illuminating devices in the vicinity of the door 102 (to assist with locating a light source) and/or illuminating devices that can be moved and/or may be difficult to remember the location (such as a remote).

The various states (e.g., first state, second state, third state, etc.), in accordance with the present embodiment, can include illuminating displays and/or user interfaces of illuminating devices. In contrast, some prior room automation systems may include illuminating actual light sources (e.g., lamps/other lights) upon a person entering the room. Further, in some prior room automation systems, an illuminating device may illuminate when a person comes close to the illuminating device (e.g., proximity sensing). However, such prior solutions do not illuminate based on a state change associated with the room and/or do not illuminate a display and/or user interface (e.g., backlight) of the illuminating device.

Illuminating based on a state change can allow devices to illuminate at different predefined settings associated with different states of the room. The different settings, in addition to illuminating a display and/or user interface of the device(s), can be used to prevent disturbing a sleeping person, to familiarize a person with a room, and/or for other conveniences. Further, a person can become aware of devices that are possibly further away than a proximity sensor may support.

Figure 2:
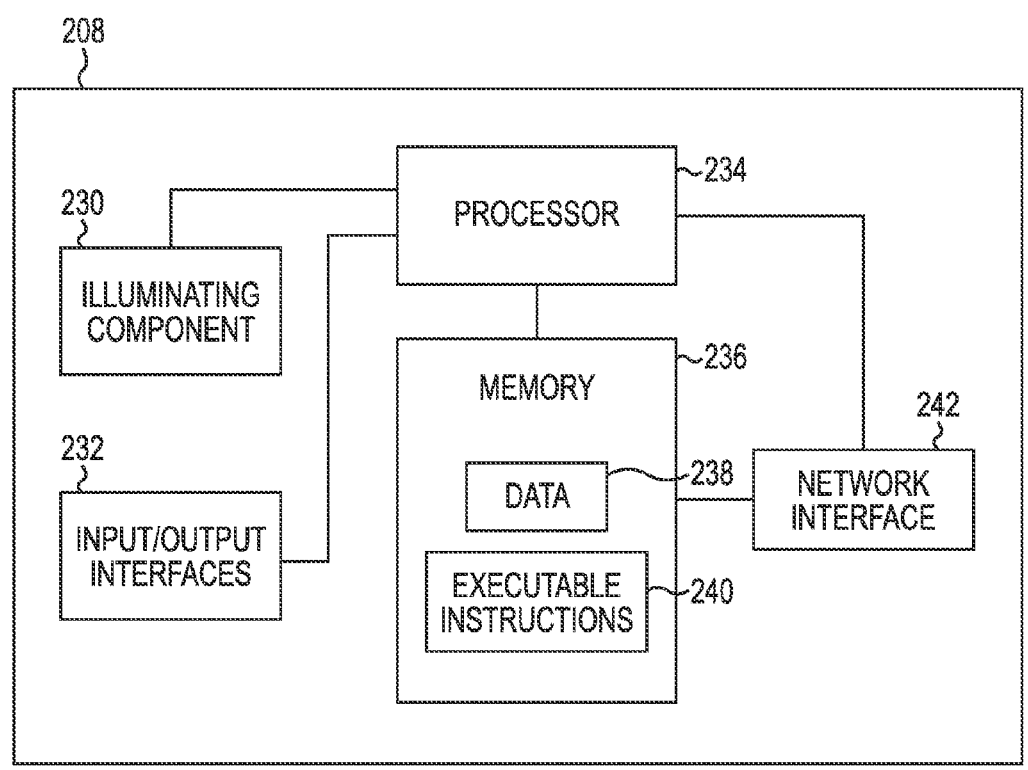
FIG. 2 illustrates an example of an illuminating device in accordance with one or more embodiments of the present disclosure.

FIG. 2 illustrates an example of an illuminating device 208 in accordance with one or more embodiments of the present disclosure. The illuminating device 208, in some embodiments, can include a control device of an illuminating system (such as the system 100 illustrated in FIG. 1).

The illuminating device 208 can include a computing component (e.g., the processor 234 and the memory 236) and an illuminating component 230. The computing component can include a memory 236 and a processor 234 coupled to the memory 236. The memory 236 can be any type of storage medium that can be accessed by the processor 234 to perform some examples of the present disclosure. For example, the memory 236 can be a non-transitory computer readable medium having data 238 and computer readable instructions (e.g., executable instructions 240) stored thereon that are executable by the processor 234 to perform some examples of the present disclosure.

The memory 236 can be volatile or nonvolatile memory. The memory 236 can also be removable (e.g., portable) memory, or non-removable (e.g., internal) memory. For example, the memory 236 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory. Further, the memory 236 can be located in the computing component, or internal to another computing component (e.g., enabling computer readable instructions to be downloaded over the Internet or another wired or wireless connection).

The illuminating device 208 can be in communication with the plurality of sensors and/or other devices via a communication path. The communication path, in some embodiments, can include a wireless and/or wired communication between the illuminating device 208 and the sensors and/or the other device. For instance, the communication path can be such that the computing component is remote from the sensors and/or other devices such as in a network relationship between the computing component and the sensors and/or other devices. As such, as illustrated in the embodiment of FIG. 2, a system can include a network interface 242. Such an interface can allow for processing on another networked computing device or such devices can be used to obtain signals from other illuminating devices and/or sensors with some embodiments provided herein. That is, the communication path can be a network relationship. Examples of such a network relationship can include a local area network (LAN), wide area network (WAN), personal area network (PAN), and the Internet, among others.

As illustrated in the embodiment of FIG. 2, illuminating device 208 can include one or more input and/or output interfaces 232. Such interfaces can be used to connect the illuminating device 208 with one or more input or output devices. The input/output interface 232 can receive data, storable in the data storage device (e.g., memory 236). Such data (e.g., data 238) can include signals from sensors, signals from another illuminating device (such as, a state change), the current state of the room, past states of the room, and/or inputs from a person, among other data.

The computing component can, for instance, include executable instructions to determine a change in a state associated with the room in which the illuminating device 208 is located based on a signal. The signal can be, for instance, from one or more sensors and/or from a control device. Example signals can include identification of a sequence of a door opening and closing, identification of motion in the room, and/or identification of heat in the room indicative of a person, among other signals.

Determining the change in state can, for instance, include determining a room is preoccupied based on signals received from the plurality of sensors in the room (e.g., determining a first person is occupying the room when a second person enters the room and/or a preoccupied state). Alternatively, determining the change in the state can include determining a person has entered the room while the room is unoccupied.

In some embodiments, the computing component can include executable instructions to send a signal to the plurality of illuminating devices (e.g., the remaining plurality of devices). The signal can instruct at least a portion of the plurality of the illuminating devices to illuminate at the predefined setting associated with the change in the state of the room.

The illuminating device 208 can include an illuminating component 230. An illuminating component 230, as used herein, includes a source of light. The illuminating component 230 can include, for instance, a circuit board that includes one or more light sources (e.g., such as light emitting diodes (LEDS)). In some embodiments, the illuminating component 230 can be a backlight (e.g., illuminating device 208 can be backlit by illuminating component 230). The illuminating component 230 can, for instance, illuminate at a number of predefined settings.

For instance, the illuminating component 230 can illuminate the illuminating device 208 at a predefined setting associated with the determined state change of the room. Further, the illuminating component 230 can discontinue illuminating the illuminating device 208 a predefined amount of time after the determined change in the state of the room.

The illuminating can, for instance, include illuminating a display and/or a user interface of the illuminating device. For instance, an illuminating component of a thermostat and/or a safe can illuminate a user interface. An illuminating component of a television remote and/or an alarm clock can illuminate a display of the device. An illuminating component of a mini-bar can illuminate the light source of the mini-bar. Further, an illuminating component of a light switch can illuminate a backing of the light switch. Although embodiments in accordance with the present disclosure are not so limited to the present illustrated examples.

Figure 3:
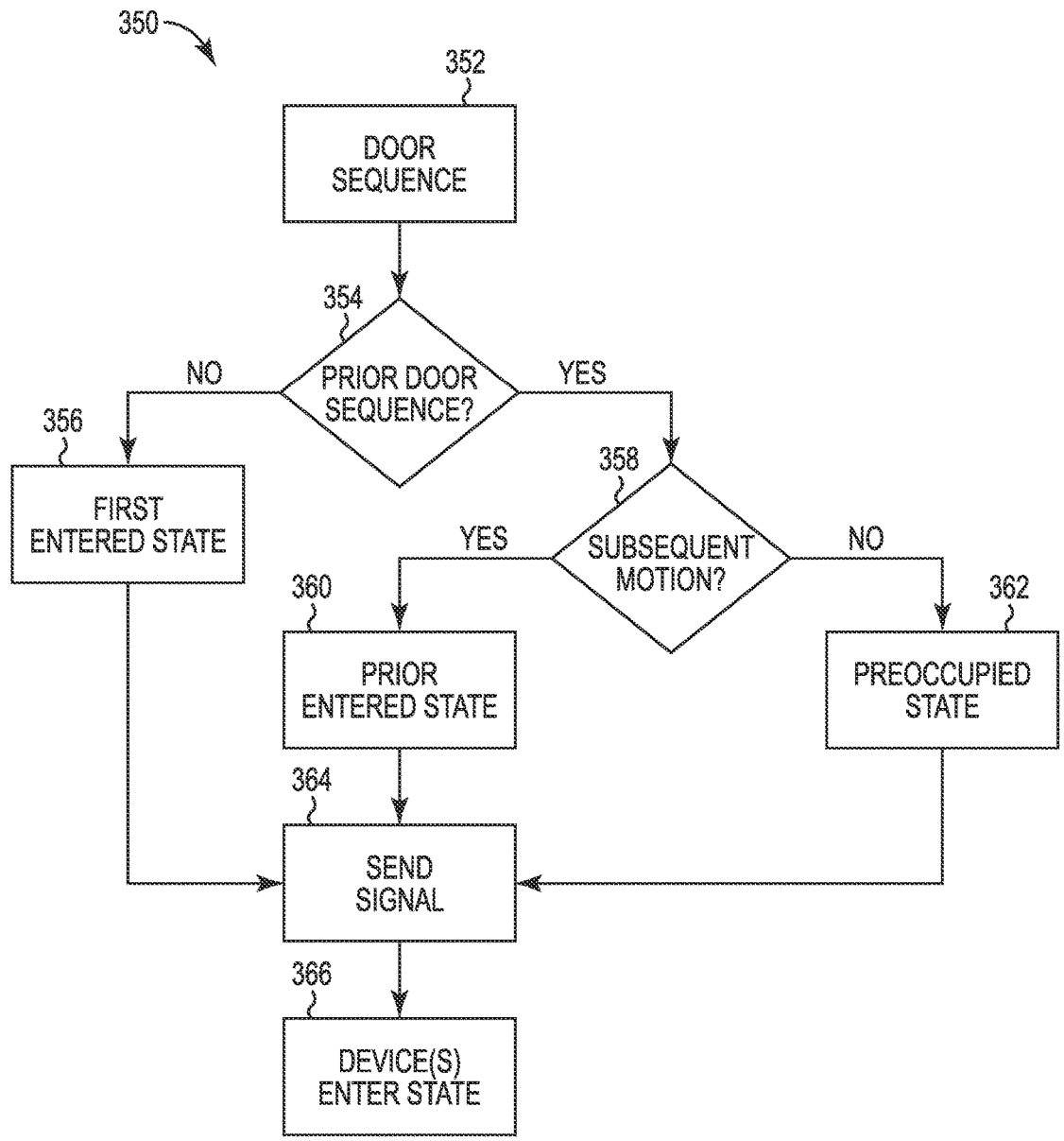
FIG. 3 illustrates an example of a method for using a system in accordance with one or more embodiments of the present disclosure.

FIG. 3 illustrates an example of a method 350 for using a system in accordance with one or more embodiments of the present disclosure. The method 350 can be performed, for instance, using an illumination system, such as the system 100 previously described in connection with FIG. 1, and/or an illuminating device, such as the device 208 previously described in connection with FIG. 2.

At block 352, a door sequence can occur. A door sequence can include a sequence of a door opening and closing, and can be sensed using a sensor (e.g., a door sensor) of the system.

A determination, at block 354, can be made as to whether a prior door sequence has occurred. A prior door sequence can include a prior sequence of the door opening and closing. The prior door sequence (e.g., a first sequence) can be after an indication in the system that the next door sequence is a first time entry.

The indication in the system that the next door sequence is a first time entry can include an input to the control device and/or system by a person associated with the room. Example persons can include a manager of the location (e.g., hotel manager), a service personal (e.g., front desk assistant), and/or a cleaning representative (e.g., housekeeper), among other persons.

The input can include, for instance, setting the system to be in an unoccupied state. The input can be made using an input device (e.g., user interface) of the control device and/or an illuminating device in the system. An unoccupied state, as used herein, can be a state indicating no person is occupying the room.

Once a system enters an unoccupied state, a subsequent door sequence can, for instance, change the state of the room to a first entered state. For example, at block 356, in response to determining no prior door sequence occurred, the illuminating device and/or control device can determine the state of the room is a first entered state.

In response to determining a subsequent door sequence occurred, at block 358, a determination can be made as to whether subsequent motion in the room occurred. The determination can include the illuminating device and/or control device to determine a room is preoccupied based on signals received from a plurality of sensors in the room.

For example, the determination can include the illuminating device and/or control device identifying a first sequence of a door opening and closing with subsequent motion in the room and identifying a second sequence of the door opening and closing with subsequent motion in the room. The identification can be based on signals from a door sensor and/or an occupancy sensor.

In response to identifying subsequent motion, at block 362, the illuminating device and/or control device can determine the state of the room is a preoccupied state. And, in response to not identifying subsequent motion, at block 360, the illuminating device and/or control device can determine the state of the room in a prior entered state.

In some embodiments, at block 364, the control device can send a signal to the plurality of illuminating devices in the room. At least a portion of the illuminating devices, at block 366, can enter the particular state.

The signal can include an indication of the change in the state of the room. That is, the signal can instruct at least a portion of the plurality of illuminating devices to illuminate at a predefined setting associated with the change in the state of the room.

In accordance with some embodiments of the present disclosure, multiple state changes can occur in the room over time. For instance, a control device can send a second signal to the plurality of illuminating devices, wherein the second signal instructs at least a portion of the plurality of illuminating devices to illuminate at a predefined setting associated with a second change in the state of the room (e.g., a revised state). The revised state can include the same state as a past state (e.g., past state that expired is a previously entered state and the revised state is a previously entered state) and/or a different state (e.g., past state that expired is a first entered state and the revised state is a previously entered state).

Any of the above information, data, and/or images can be saved along with the number of images as metadata and/or a data file which can be available for later image processing and/or other purposes.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of some embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the some embodiments of the disclosure includes any other applications in which the above structures and methods are used. Therefore, the scope of some embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An illuminating device, comprising:
    a computing component configured to determine a change in a state associated with a room in which the illuminating device is located based on a signal from a sensor, wherein the change in the state includes entry into a first state, a second state, or a third state, wherein determining the entry into the first state includes determining a first time a person has entered the room after the room has been set to be in an unoccupied state, wherein determining the entry into the second state includes determining a subsequent entry into the room after the entry into the first state has been determined and while the room is unoccupied, and wherein determining the entry into the third state includes determining that a first person is occupying the room when a second person enters the room after the entry into the first state has been determined; and
    an illuminating component configured to:
        illuminate the illuminating device at a first predefined setting associated with the entry into the first state;
        illuminate the illuminating device at a second predefined setting associated with the entry into the second state;
        illuminate the illuminating device at a third predefined setting associated with the entry into the third state; and
        discontinue illuminating the illuminating device a predefined amount of time after the change in the state.

2. The device of claim 1, wherein the signal from the sensor includes an identification of a sequence of a door opening and closing.

3. The device of claim 1, wherein the signal from the sensor includes an identification of motion in the room.

4. The device of claim 1, wherein the signal from the sensor includes an identification of heat in the room.

5. The device of claim 1, wherein the illuminating component configured to illuminate the illuminating device includes illuminating a user interface and/or display of the illuminating device.

6. A non-transitory computer readable medium, comprising instructions executable by a processing resource to cause a computing device to:
    set a room to be in an unoccupied state;
    determine a first time a person enters the room while the room is in the unoccupied state based on signals received from a plurality of sensors in the room; and
    send a signal to a plurality of illuminating devices in the room, wherein the signal instructs at least a portion of the plurality of illuminating devices to illuminate at a predefined setting associated with a change in a state of the room responsive to a subsequent entry into the room after the first time the person enters the room has been determined and while the room is unoccupied, and wherein the predefined setting is a different setting than a setting associated with a determination that the room is occupied when a second person enters the room after the first time the person enters the room has been determined.

7. The medium of claim 6, wherein the predefined setting includes a predefined brightness for a predefined amount of time.

8. The medium of claim 6, wherein the signal includes an indication of the change in the state of the room.

9. The medium of claim 6, wherein the instructions include instructions executable by the processing resource to determine the change in the state of the room.

10. The medium of claim 6, wherein the signal includes an instruction for a subset of the plurality of illuminating devices that are in a vicinity of a door of the room to illuminate at the predefined setting.

11. The medium of claim 6, wherein the instructions are executable to determine the room is occupied by:
    identifying a first sequence of a door opening and closing with subsequent motion in the room; and
    identifying a second sequence of the door opening and closing with subsequent motion in the room.

12. The medium of claim 6, wherein the instructions include instructions executable by the processing resource to:
send an additional signal to the plurality of illuminating devices, wherein the additional signal instructs at least a portion of the plurality of illuminating devices to illuminate at a predefined setting associated with an additional change in the state of the room.

13. A system, comprising:
a door sensor configured to detect a sequence of a door of a room opening and closing;
an occupancy sensor configured to detect a person located in the room;
a control device configured to:
send a signal to a plurality of illuminating devices of the system to enter a first state responsive to a determination that a person has entered the room a first time after the room has been set to be in an unoccupied state based on the detection by the door sensor and the occupancy sensor;
send a signal to the plurality of illuminating devices of the system to enter a second state responsive to a determination of a subsequent entry into the room after the determination that the person has entered the room the first time and while the room is unoccupied based on the detection by the door sensor and the occupancy sensor; and
send a signal to the plurality of illuminating devices to enter a third state responsive to a determination that a first person is occupying the room when a second person enters the room after the determination that the person has entered the room the first time;
wherein the plurality of illuminating devices are configured to illuminate at a first predefined brightness and for a first predefined amount of time associated with the first state, a second predefined brightness and for a second predefined amount of time associated with the second state, and a third predefined brightness and for a third predefined amount of time associated with the third state.

14. The system of claim 13, wherein the third predefined brightness and the third predefined amount of time associated with the third state are lower than the first predefined brightness and the first predefined amount of time associated with the first state.

15. The system of claim 13, wherein at least one of the plurality of illuminating devices is configured to output an acoustic signal upon entering the third state.

* * * * *